July 7, 1959 R. W. HUGHES ET AL 2,894,249

DATA PROCESSING CONTROL SYSTEM

Filed May 16, 1957 2 Sheets-Sheet 1

Inventors
ROBERT W. HUGHES
HANS K. FLESCH
By Philip M. Bolton
Attorney

TABLE I

| | TAPE CODE | FLIP-FLOP CONDITION |
|---|---|---|
| A | - + - - - | 1 1 0 1 1 |
| B | - - - + - | 1 0 1 1 1 |
| C | - + + - + | 1 1 1 0 1 |
| D | - + + + + | 1 1 1 1 0 |

Inventors
ROBERT W. HUGHES
HANS K. FLESCH
By Philip M. Bolton
Attorney

United States Patent Office 2,894,249

Patented July 7, 1959

2,894,249

DATA PROCESSING CONTROL SYSTEM

Robert W. Hughes, Mountain Lakes, and Hans K. Flesch, Nutley, N.J., assignors to International Telephone and Telegraph Corporation, Nutley, N.J., a corporation of Maryland Application May 16, 1957, Serial No. 659,714

8 Claims. (Cl. 340—174)

This invention relates to data processing systems and in particular to a system wherein there is a recorded source of clock pulses used to effect the synchronization of the operations of the data processing system.

In the many data processing systems, there is found a variety of different types of storage systems. Although electrostatic storage and electronic storage schemes play a very important role in the field, there has been a strong tendency to store information in binary form on magnetic tapes, magnetic drums and photographic films. These latter forms of storage records customarily have a plurality of "tracks" upon which there is written or stored information, such as data pertaining to the payroll of a particular company. Further, in conjunction with these records there is customarily found a plurality of reading heads either magnetic sensitive or photosensitive depending on the records which are used. These reading heads are adapted to read from the records the binary information bits found thereon which represent the data to be processed, such as the information pertaining, as suggested above, to a payroll.

When one of these latter types of storage records is used, it becomes necessary to either physically move the record having the information stored thereon relative to a reading head, which is capable of reading the information therefrom, or to move the reading head relative to the storage record to effect a readout. Irrespective of which operation is used, it is clear that the operation of the record driving means of the data processing system must be synchronized with the rest of the system, lest an "adding" device in the system might get a signal to "add" before all the information was read from the record, or a printing device might get a signal to "print" before all the information was read from the record, etc.

The above problem has been well recognized in the art, and it has become customary to add a clock pulse track to the information storage record. The clock pulse track acting as a reservoir of clock pulses has become the source of timing pulses for all operations of the system. With the advancement of this art, programming, also, to direct the different operations has become highly important. In order to transmit the programming information in synchronization with the clock pulses, it has become customary in the art to add an additional information track to the record. The information found on the additional track serves as a programming feature, and pulses are included or omitted such that the presence or absence of the pulses on the additional track gives rise to a code which causes the machine to perform a particular operation indicated by the code.

The necessity of an additional track obviously results in a loss of track space whereon there might be stored more data information. It follows that it would be desirable to have an arrangement whereby the storage means could have a clock pulse track with clock pulses thereon arranged for the timing or synchronization of the various data processing operations, and further simultaneously arranged to have their clock pulses, according to a "presence or absence" arrangement, form a code and thus effect a programming operation without using an additional track.

It is therefore an object of the present invention to provide an improved control system for data processing systems.

It is a further object of this invention to provide a control system which can recognize a "presence or absence" arrangement of clock pulses and decode this arrangement to effect a programming feature.

It is a still further object of this invention to provide a control system which can accomplish the last-mentioned object while yet providing the data processing system with timing pulses for proper synchronization.

A further object of this invention provides a control system which uses a single coded clock pulse track to accomplish synchronization and programming operations for a data processing system.

In accordance with a main feature of the present invention there is provided a pulse time delaying means coupled to a reading head, said head being adapted to recognize the absence or presence of clock pulses which appear on a clock pulse track of a binary information storage record, said delaying means having a plurality of taps, with each tap representing a period of time delay which equals the period of time between the clock pulses as read by said reading head, such that the "presence-absence" arrangement of said clock pulse appears along the pulse delaying means as a programming code which is read therefrom to effect a programmed data processing operation.

In accordance with another feature of the present invention there is provided an "or" gate arrangement coupled between the taps of said pulse delaying means and a driving means such that at least one pulse will always be available from the pulse delaying means to be passed through said "or" gate to synchronize the driving means with the clock pulses although there may be an absence or a series of absences of the clock pulses on the track.

In accordance with a still further feature of the present invention there is provided switching circuitry means which are coupled to the pulse delaying means, said switching means being adapted to recognize the clock pulse "presence-absence" arrangement or code appearing on said pulse delaying means and responsive to the condition of said arrangement to effect different output signals in accordance with the arrangement or code.

Another feature of the present invention provides for a plurality of additional means coupled to the logic circuitry described in the second feature above and coupled to a plurality of reading heads which are adapted to read from the information storage record the data information to be processed, such that the information to be processed will be taken from the storage record in synchronization with the clock pulses and such that there will always be available clock pulses for said synchronization notwithstanding the absence of certain clock pulses in accordance with a code, on the clock pulse track.

The foregoing and other objects and features of this invention and the manner of attaining them will become more apparent and the invention itself will be best understood by reference to the following description of an embodiment of the invention taken in conjunction with the accompanying drawings comprising Figs. 1 and 2, wherein.

Figure 1:
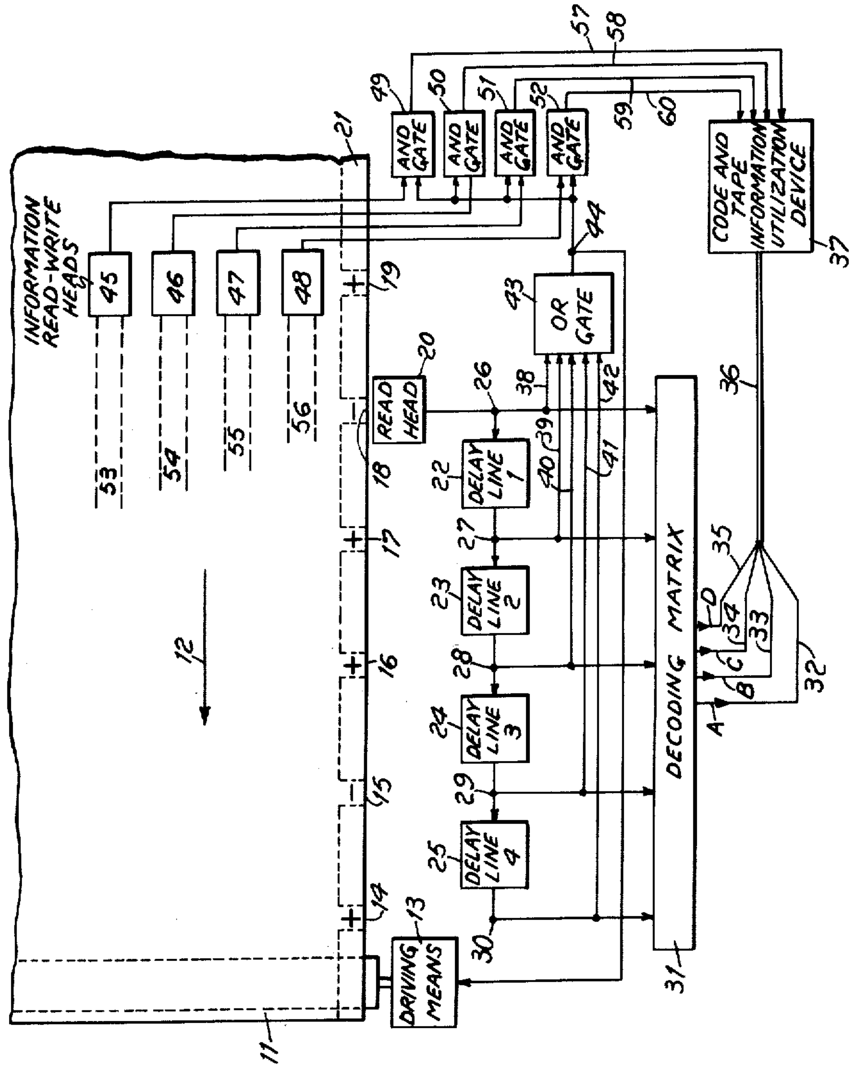
Fig. 1 is a block diagram of the system.
Figure 2:
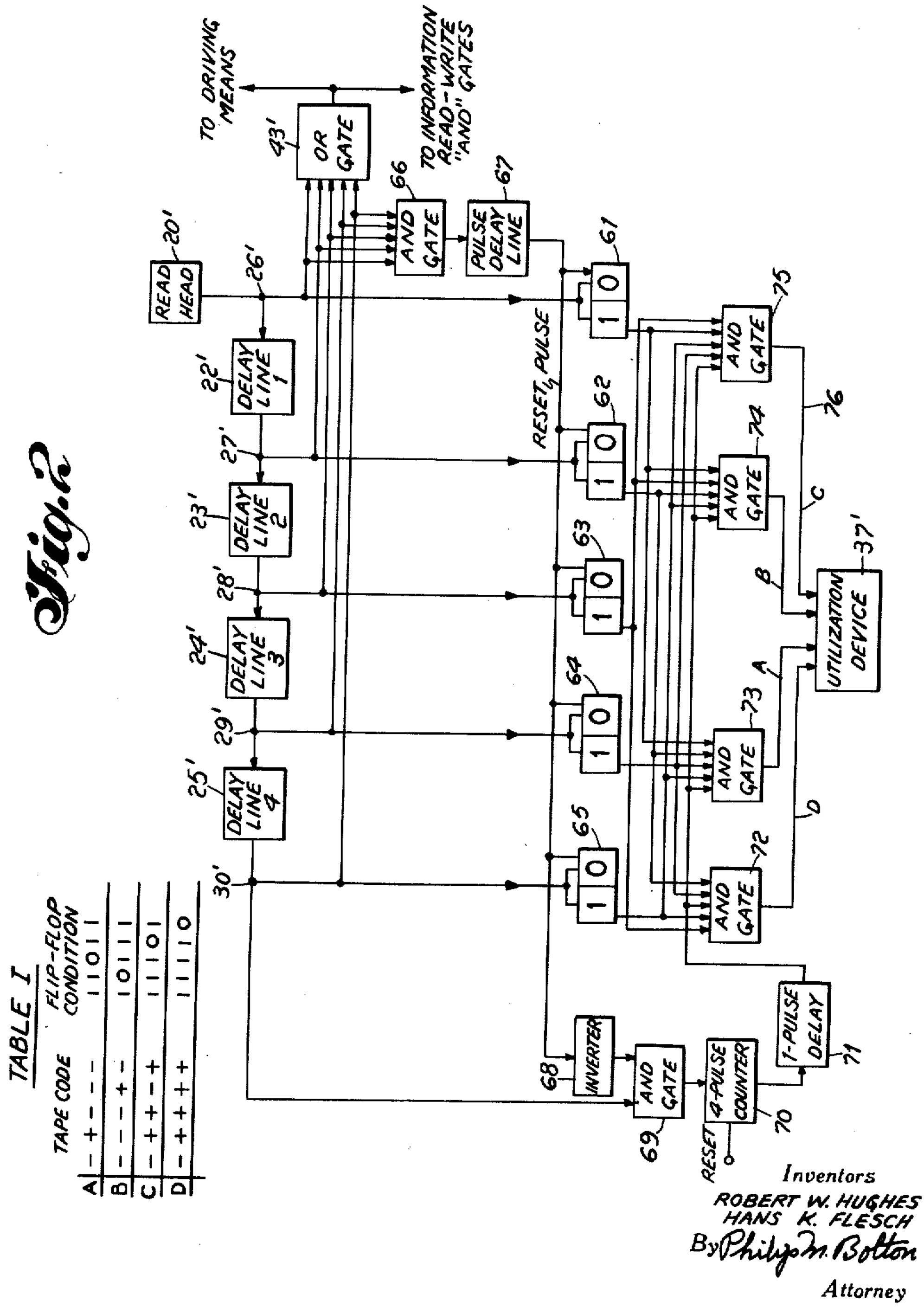
Fig. 2 is a schematic of switching circuitry which can be used with the system of Fig. 1.

Referring to Fig. 1 there is found a magnetic tape storage means 11. A magnetic tape is shown in Fig. 1 for purposes of illustration, although the storage means could be a magnetic drum, a roll of film or other suitable means. The tape 11 is moving in the direction shown by the arrow 12 in Fig. 2 and is driven by the driving means 13. A series of clock pulse positions 14 through 19 are shown by indentations on the tape 11, to clearly illustrate the positions of the clock pulses, but the tape is not actually designed in accordance with this aspect of the illustration or limited by the illustration. The reading head 20 is disposed adjacent to the magnetic tape 11 to recognize from the clock pulse track 21 the presence or absence of clock pulses in the clock pulse positions 14 through 19. As clock pulses are read from the positions 14 through 19, these pulses pass along the plurality of serially connected delay lines 22 through 25. There is connected to this plurality of delay lines a plurality of taps 26 through 30. In view of the discussion to follow let us define a + as the "presence" of a pulse and a − as the "absence" of a pulse; then as illustrated in Fig. 1, there are pulses appearing at pulse positions 14, 16, 17 and 19 and the "presence-absence" arrangement of these pulses represents a code which starts at the pulse position 15 and is as follows: − + + − +. From the Table 1 of Fig. 2 this arrangement represents code C. The clock pulses at 14, 16 and 17 having passed the reading head 20, as illustrated in Fig. 1, will appear at the delay line taps 30, 28 and 27. At such time as the "absence" of a pulse, as shown by 15, appears at tap 30, which will be the time that the clock pulse at position 19 appears at read head 20, there will be a readout of the pulses appearing along the delay line taps 26 through 30; said readout being initiated by the decoding matrix 31. The decoding matrix 31, which can be of the form shown in Fig. 2, is adapted to recognize the arrival of a blank or "absence" of a pulse at tap 30, and to thereafter cause the "presence-absence" arrangement to be decoded and to pass a signal along one of the output lines 32 through 35 in accordance with the decoded arrangement. The common line 36 connects the individual matrix outputs 32 through 35 to the utilization device 37. Each of the output lines 32 through 35 can respectively represent one of the codes of Table 1 on Fig. 2. It is obvious that many codes could be arranged and introduced to program various operations of the data processing system and it is also obvious that there are numerous decoding matrices which might be used to perform the role of decoding matrix 31.

During the passing of the clock pulses past the reading head 20, there will always appear along the delay lines, at least at one of the taps 26 through 30, a "present" pulse. Coupled respectively to each of the taps 26 through 30 is one of the "or" gate connecting wires 38 through 42 which are in turn connected to the "or" gate 43. As long as there is at least one "present" pulse available it will pass through the "or" gate 43 to a parallel path starting at point 44. From point 44 one leg of the parallel path will direct a "present" pulse output from the "or" gate 43 to the driving means 13. By having the driving means 13 receive a "present" pulse from the gate 43, it assures that the driving means 13 receives a synchronizing pulse even during the time that the clock pulses would not be available from the track 11 such as illustrated at the clock pulse positions 15, and 18.

A plurality of read-write heads 45 through 48 are connected with one each to an associated one of the "and" gates 49 through 52. The read-write heads 45 through 48 read the information bits appearing along a plurality of data information tracks 53 through 56 and transmit data information pulses in accordance with the information bits found on the tracks 53 through 56. The data information pulses are passed from the respective read-write heads 45 through 48 to an associated one of the "and" gates 49 through 52. These data information pulses, respectively condition one half of the associated "and" gate to which they are passed. The "and" gates 49 through 52 are coupled to point 44 by circuitry means which form the other leg of the parallel path from point 44, as described above. A "present" pulse passing from the "or" gate 43 is directed along the above mentioned other leg of the parallel path from point 44 to the "and" gates 49 through 52, to further condition these "and" gates. In conjunction, the data information pulses, with the "present" pulses will condition the respective "and" gates to cause an output therefrom. The respective output signals from the "and" gates 49 through 52 are passed along the lines 57 through 60 to the utilization device 37. The components 45 through 48 have been described as read-write heads because it is clear that a magnetic sensitive head or a photosensitive head might be used to write as well as read, if such head were used in conjunction with well-known circuitry.

If the user of the system wanted to employ a technique to detect an error instead of a code arrangement or in addition to a code arrangement, along the delay lines, such an error detection technique might easily be accomplished by having the system recognize two blank or absent pulses, if this were the limit of tolerable error.

Referring to Fig. 2 there is found a scheme of the system which can be used for the decoding matrix 31 or the switching circuitry necessary for the operation in Fig. 1. The components found in Fig. 2 which have a counter-part in Fig. 1 are identified by the Fig. 1 numbers only differing in that there is a prime on the Fig. 2 figures.

The read head 20' is connected, as in Fig. 1, to a plurality of delay lines 22' through 25' which are serially connected to each other and which in turn have a pluraity of taps 26' through 30'. Normally there will be "present" pulses appearing at the taps 26' through 30' until a code arrangement appears on the clock pulse track. As can be seen on Table 1, the codes are introduced by an "absent" pulse or a blank. As long as there are "present" pulses on the taps, these pulses will be passed to the bistable multivibrators 61 through 65, causing these bistable multivibrators to be "flipped." Simultaneously these "present" pulses will be passed to condition the "and" gate 66, the output of which is passed to pulse delay line 67. The purpose of 67 is to effect a pulse to reset the flip flops 61 through 65 back to zero each time after 5 "present" pulses have been recognized along the taps 26' through 30'. The pulse delay line 67 takes a pulse output from the "and" gate 66 and delays it so that it is effective after the 5 present pulses along the taps, which conditioned "and" gate 66, have sent the flip flops to the "one" positions. In this way the flip flops 61 through 65 will read 11110 with the appearance of a blank at the tap 26'. This is true because the "present" pulses appearing at the taps 27' through 30' will flip the multivibrators 61 to 65 to the "one" side; the blank at 26' will not effect the flip flop 61 which is in the zero state from a previous reset; and there will be no reset now because the "and" gate 66 can have no output with a blank at 26'. If any particular code from Table 1 is chosen and followed along the series connected delay lines, the conditions of the respective flip flops will vary and finally the overall condition will be in one of the forms on Table 1, "Flip Flop Conditions." When the blank or "absent" pulse appears at 26' there will be, as described above, no output from the pulse delay 67 to the invertor 68. As long as there are "present" pulses appearing at all the taps 26' through 30', there will be an output pulse from 67 and this output pulse being inverted at 68 will condition the "and" gate 69 for no output. Consequently when the invertor 68 receives no output from 67 there is no negative conditioning of 69 and the pulses from tap 30' effectively pass the "and" gate 69 to the counter 70. There will be 4 "present" pulses appearing along the taps 27' through 30' when a blank appears at 26'. The role of the counter 70, which becomes obvious, is to count the 4 present pulse, described above, and indicate an output when 4 pulses have been counted. The output from 70 is delayed by the one pulse delay 71 such that the pulse from counter 70 is passed to the "and" gates 72 through 75 at such time as the blank or "absent" pulse, which initiated the 4 pulse counting by its appearance at 26', is at 30'. The flip flops are now in a condition representative of a code. If the coding scheme is according to Table 1 and code C has been chosen there will be an output along the channel 76 to the utilization device 37.

The circuitry of Fig. 2 is merely an example of a possible switching circuit which could be used in the role of the decoding matrix 31 of Fig. 1. Different variations could be used such as eliminating the continual flipping back and forth of the multivibrators 61 through 65. If the user employed some inhibiting devices between the taps 26' through 30' and the flip-flops 61 through 65, and further channeled the output of the counter 70 to these inhibiting devices to effect a coincident pulse, the code pattern would appear at the flip flop inputs simultaneously with the coincidence of the pulse from 70. The last-mentioned scheme could be extended further to eliminate the flip flops by having circuitry from the inhibitors pass directly to the "and" gates 72 through 75.

While we have described above the principles of our invention in connection with specific apparatus, it is to be clearly understood that this description is made only by way of example and not as a limitation to the scope of our invention as set forth in the objects thereof and in the accompanying claims.

We claim:

1. A control system for controlling a data processing system adapted to read binary information bits from a record, said binary bits representing clock pulses which are necessary for the data processing operation timing of said system and whose presence and absence on said record further represent programing information for said data processing operations comprising a record having binary information bits located thereon in predetermined positions, a reading device sensitive to the presence and absence of said binary information disposed adjacent said record, driving means to effect a relative motion between said record and said reading device, a pulse delaying means with a plurality of taps thereon each representing a different delay value coupled to said reading device, and switching circuitry coupled to said plurality of taps and responsive to the delayed pulses passed therefrom, to direct said pulses to said driving means to control the timing thereof, said switching circuits including means for simultaneously decoding said pulses for programing said data processing operations.

2. A control system according to claim 1, wherein said record further includes binary data information bits and wherein said system further includes a plurality of data information read heads adapted to read and transmit pulses in accordance with said binary information bits, a plurality of coincident devices with one each coupled to an associated one of said reading heads, and circuitry means coupling said coincident devices to said switching circuitry to further direct said clock pulses to effect a coincident condition at said coincident devices between said clock pulses and said data information bit pulses read and transmitted by said reading heads.

3. A control system according to claim 1, wherein said switching circuitry includes an "or" gate coupled in parallel to each of said taps and in series to said driving means, a plurality of bistable multivibrators with one each coupled to an associated one of said taps and a plurality of coincident devices coupled to said plurality of bistable multivibrators whose respective outputs effect in conjunction with said multivibrators said decoding operation.

4. A control system for controlling a data processing system wherein said data processing system has a data storage device upon which there is a clock pulse track having clock pulses which are necessary for the synchronization of various operations in a data processing system and whose presence and absence on said track further present programing information for said data processing operations comprising a binary data storage means with a clock pulse track, said clock pulse track having binary information bits located thereon in predetermined positions, a reading device sensitive to the presence and absence of said binary clock pulse information bits disposed adjacent said data storage means, driving means to move said storage means relative to said reading head means, a pulse delaying means with a plurality of taps thereon each representing a different delay value coupled to said reading head means, and switching circuitry coupled to said plurality of taps responsive to the delayed pulses passed therefrom to direct said clock pulses to said driving means to control the timing thereof, said switching circuitry including means for simultaneously decoding said pulses for programming said data processing operations.

5. A control system according to claim 4, wherein said data storage means is a magnetic tape and said reading device is a magnetic reading head.

6. A control system according to claim 4, wherein said data storage means is a magnetic drum and said reading device is a magnetic reading head.

7. A control system according to claim 4, wherein said data storage device is a photosensitive means and said reading device is a photosensitive reading head device.

8. A control system for controlling a data processing system wherein said data processing system has a magnetic storage device upon which there is a clock pulse track, said clock pulse track having binary information bits thereon which are necessary for the synchronization of various operations in the data processing system and whose presence and absence on said track further represent programming information for said data processing operations comprising a magnetic tape storage means with a clock pulse track thereon, said clock pulse track having binary information bits located thereon in predetermined positions, a magnetic reading head sensitive to the presence and absence of said binary information bits located adjacent to said magnetic tape storage means, driving means to move said magnetic tape storage means relative to said reading head, a plurality of delay lines coupled in series to said reading head, an "or" gate connected in parallel to the predetermined delay points of said serially connected plurality of delay lines, a plurality of data information read-write heads positioned adjacent to said magnetic tape storage means for reading data information therefrom and transmitting pulses in accordance therewith, a plurality of "and" gate devices with one each serially coupled to one each of said read-write head devices, driving means serially coupled to the output means of said "or" gate, parallel circuitry means coupling said plurality of said "and" gates to said "or" gate output means, switching circuitry means including decoding means coupled in parallel to predetermine delay points of said serially connected plurality of delay lines for accepting the pulses passed therefrom to decode said pulses for programming said data pulse operations.

References Cited in the file of this patent

UNITED STATES PATENTS

| | | |
|---|---|---|
| 2,700,155 | Clayden | Jan. 18, 1955 |
| 2,811,713 | Spencer | Oct. 29, 1957 |

FOREIGN PATENTS

| | | |
|---|---|---|
| 743,416 | Great Britain | Jan. 18, 1956 |